March 9, 1954 — W. A. RAY — 2,671,837
FLOATING BIMETAL THERMOSTAT

Filed June 29, 1950 — 2 Sheets-Sheet 1

WILLIAM A. RAY,
INVENTOR.

BY John Flam
ATTORNEY

March 9, 1954  W. A. RAY  2,671,837
FLOATING BIMETAL THERMOSTAT
Filed June 29, 1950 2 Sheets-Sheet 2

WILLIAM A. RAY,
INVENTOR.

BY John Flam
ATTORNEY

Patented Mar. 9, 1954

2,671,837

UNITED STATES PATENT OFFICE 2,671,837

FLOATING BIMETAL THERMOSTAT

William A. Ray, North Hollywood, Calif., assignor to General Controls Co., a corporation of California Application June 29, 1950, Serial No. 171,070

4 Claims. (Cl. 200—138)

1

This invention relates to bimetal thermostats, and especially to thermostats adapted to control an electric circuit.

Such thermostats are in common use for controlling the operation of a heating system in response to temperature variations in a space. Thus, for heating a room, the thermostat may be adjusted to cause a gas burner to ignite when the temperature of the room drops appreciably below the temperature to which the thermostat is adjusted. Similarly, when the temperature appreciably exceeds the desired value, the flow of fuel to the gas burner is interrupted.

It is desirable that the making and breaking of the thermostat contacts be effected within a very narrow range. Accordingly, the contacts are "floating"; the position of the contact carried by the bimetal is gradually altered in accordance with the temperature of the bimetal. Accordingly, very slight variations in this temperature result in a change from closed to open position, and vice versa.

In such floating thermostats, foreign matter is apt to be deposited on the contacting surfaces. Now, under such conditions, it is necessary that the contacts be urged together by the bimetal with a stronger pressure before effective contact is obtained. Accordingly, a lower temperature than that desired is required to close the contacts, and the differential temperature between open and closed positions is increased to a disadvantageous extent. In addition, the floating contact very gradually increases its pressure on the stationary contact as the bimetal flexes; and this gradual pressure variation often sets up undesired microphonic effects.

The introduction of a resistance due to the foreign matter on the contacts, as well as to the imperfect contact upon the relaxation of pressure between them, causes a slight heating effect. This heating effect causes the thermostat to open the contacts sooner than they should, and recycling occurs too frequently.

It is one of the objects of this invention to overcome these difficulties.

In order to accomplish this result, there is a provision immediately to increase the pressure on the contacts as soon as they touch. This increase in pressure effectively eliminates all microphonic effects.

It is another object of this invention to ensure that the contacting areas be maintained clean, and especially by a slight rubbing action as the contacts are urged together. Thus, accumulation of dirt or other foreign matter on the contacts is prevented.

2

The thermostat structure embodying the invention includes a small electromagnet that is connected preferably in series with the control circuit, and exciting a pressure on the contacts just as soon as these contacts engage.

Accordingly, it is still another object of this invention to provide an electromagnet that serves to supplement the pressure between the contacts whenever they close.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
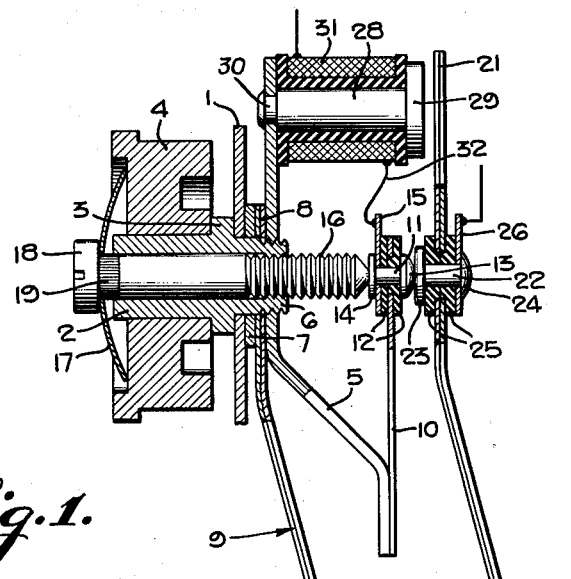
Figure 1 is a view, mainly in section, of one embodiment of the invention, the thermostat being in contact-closing position.
Figure 2:
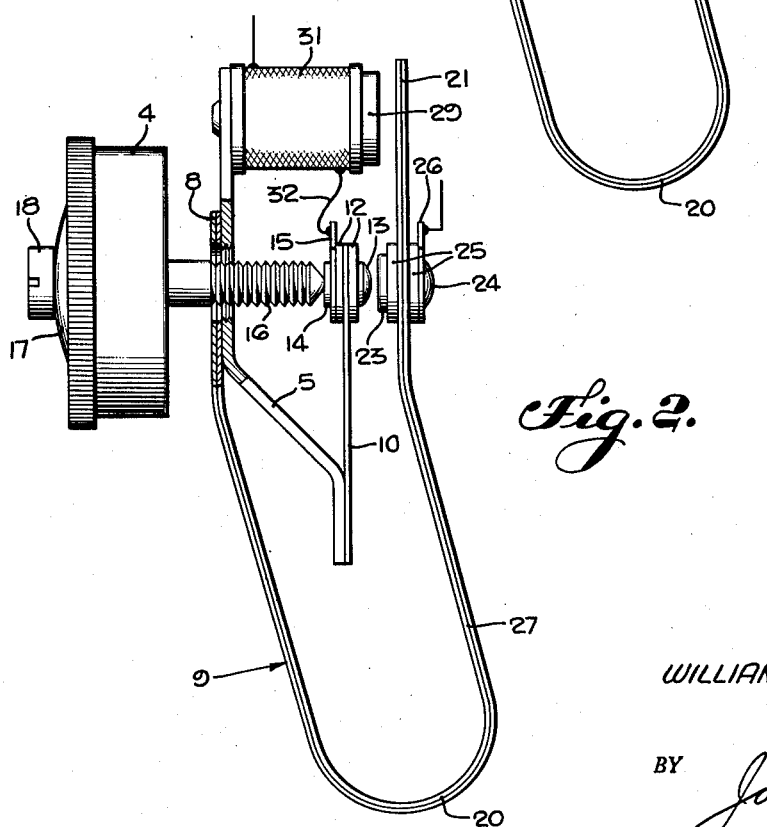
Fig. 2 is a view, similar to Fig. 1, illustrating the contacts in open position.

The thermostat structure shown in Figs. 1 and 2 includes a supporting wall 1 which may be the wall of a casing, or the like. Through an aperture in this wall extends a sleeve 2 having a shoulder 3 engaging the outer surface of the wall 1. This sleeve 2 is attached to the wall 1 by the aid of a bracket 5 having a threaded aperture engaging the threaded end 6 of the sleeve 2. Between the bracket 5 and the wall 1 are a washer 7 and the apertured end 8 of a bimetal member 9. In this manner, one end of the bimetal member 9 is anchored to a stationary part of the mechanism.

The bracket 5 carries a flexible contact carrying arm 10. The lower end of the arm 10 is attached firmly to the lower end of the bracket 5.

A contact member 11 is carried by the free end of the flexible arm 10, and is insulated therefrom by aid of the insulation bushings 12. The contact area 13 is convex. The contact member 11 is fastened to the arm 10 by riveting the end 14 over a terminal member 15 which serves to provide a connection to the contact member 11.

Adjustment of the position of contact member 11 is afforded by a screw 16 engaging internal threads at the right-hand end of the sleeve 2, and bearing against the riveted end 14 of contact 11. Turning of the screw in either direction causes corresponding movement of the contact member 11. This screw is conveniently manipulated by a manual dial 4 in the usual manner, and which is rotatably mounted on the sleeve 2 and joined to the screw 16, as by the aid of a dished plate 17. This dished plate 17 is coupled to the screw 16 below the head 18, as by the aid of the serrations 19.

Manipulation of the manual dial 4 adjusts the temperature at which the thermostat contacts open and close.

The bimetal member 9 has a bend 20, and the free end 21 carries the movable contact member 22. This movable contact member 22 is provided with a head 23. The shank of the contact member may be riveted over to form the head 24. Insulation bushings 25 serve to insulate this movable contact member 22 from the bimetal member 9. A terminal member 26 is disposed below the head 23 to provide appropriate connections.

That portion of the bimetal member 9 which extends from the anchored end 8 slopes downwardly toward the right, and the other leg 27 of the bimetal member 9 is correspondingly sloped to the free end 21.

As the bimetal member 9 flexes about the bent portion 20, the direction of movement of the contact member 22 is oblique to the contacting surfaces of the members 11 and 22. Accordingly, there is a very slight rubbing action which keeps the contact surfaces clean and free of foreign matter.

In floating thermostat contacts of this character, the movement between open and closed position of the bimetal member 9 is very slight, and is of the order of a millionth of an inch, or from about one-half of a millionth of an inch to one millionth of an inch. The rubbing movement, being transverse to the engaging movement between the contacting surfaces, is extremely slight, but it is nevertheless sufficient to maintain the contacts in operating condition.

In order to urge the contacting surfaces firmly together, as soon as contact is established, use is made of an electromagnet structure which affects the free end 21 of the bimetal member 9. Thus, mounted upon the bracket 5, above the screw 16, there is a magnetic core 28 having a pole piece 29. This magnetic core 28 may be attached to the bracket 5, as by the aid of the shank 30 which may be riveted over the bracket 5 at its free end. An electromagnet coil 31 is mounted on the core 28. The free end 21 of member 9 approaches closely to the pole piece 29. The electromagnet is energized through the contact members 11 and 22, as by the aid of the connection 32 which extends from the terminal 15 to one end of the coil 31.

Accordingly, just as soon as a light contact is effected, the pole piece 29 exerts a magnetic force upon the free end 21 of the bimetal member 9, pulling this free end inwardly to press the contacting surfaces together. In the attracted position, the air gap between the bimetal end 21 and the pole piece 29 may be of the order of one one-hundredth of an inch. By providing this air gap, even a slight flexure of the bimetal 9 outwardly is sufficient to deenergize the coil 31.

The coil 31 may be placed in parallel with the circuit controlled by the thermostat contacts, and it is so designed as to utilize a few milliwatts of electrical power.

The insulation sleeves 12 and 25 are quite thick, so as to retard the transmission of heat from the contact members 11 and 22 to the bimetal member 9. Accordingly, there is no substantial anticipating action which may occur by heating the bimetal elements.

Figure 3:
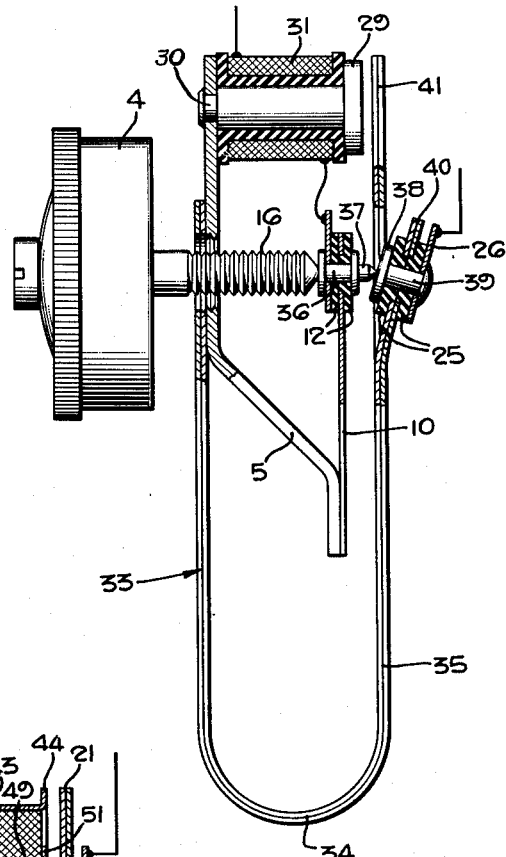
Figs. 3 and 4 are views, similar to Fig. 1, of modifications of the invention.

In the form shown in Fig. 3, the bracket 5 and the spring arm 10 are similarly arranged to the form of Figs. 1 and 2 in relation to the manual adjusting knob 4. The supporting elements of the structure are omitted, but they may include the members shown in Fig. 1. In this instance, the bimetal member 33 is made straight, and has a bend 34 to provide a leg 35 parallel with the anchored portion of the bimetal member 33. The contact member 36 is similar to contact member 11, except that its contacting point 37 is made tapered. This contacting point cooperates with the contacting head 38 of a movable contact member 39. This movable contact member, in this instance, is mounted on an upset portion 40 of the leg 35, said upset end being at an angle with respect to the axis of the contact 36.

As the bimetal member 33 flexes about the bent portion 34, the contacting surfaces have an oblique motion with respect to the contacting surfaces. This is due to the angular position of the upset portion 40.

As before, the free end 41 of the bimetal member is affected by the electromagnet coil 31 to urge the contacts together just as soon as these contacts engage.

Figure 4:
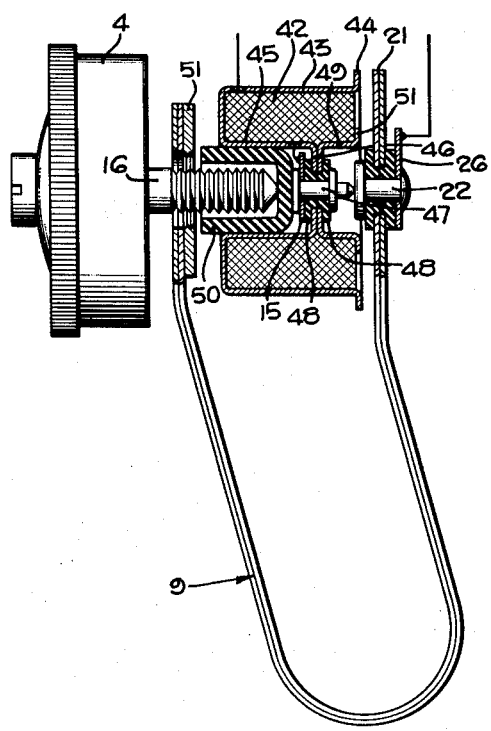

In the form shown in Fig. 4, the bimetal member 9 is arranged as in the form shown in Fig. 1, and carries the movable contact 22 in the same manner. The oblique direction of movement of the contact member 22 is effected by the sloping legs of the bimetal member 9, as described in connection with Fig. 1.

In this instance, the electromagnet coil 42 is disposed in a magnetic shell 43 providing an annular pole face 44. The shell 43 has a re-entrant portion 45 forming a recess terminating in a wall 46 that is apertured to accommodate the contact member 47. This contact member 47 is insulated from the shell 43 by the aid of the insulation sleeves 48. In order to complete the shell structure, a magnetic member 49 is utilized which is attached to the wall 46 by the aid of the contact member 47, the shank of which is riveted over the terminal 15.

In this instance, the contact 47 is supported by the aid of the re-entrant portion 45 on the shell 43 on the adjusting screw 16. This adjusting screw extends into an insulation cup 50 which is telescoped within the re-entrant portion 45. Manipulation of the dial 4 thus causes a corresponding adjustment of the contact 47. When the screw 16 is withdrawn, the bimetal member 9 and contact 22 serve to urge the shell 43 and the cup 50 against the end of the adjusting screw 16.

The free end 21 of the bimetal member 9 is influenced by the polar area 44 and the shoulder 51 formed by the member 49. As before, the electromagnet coil 44 serves to urge the contacting surfaces together upon engagement of the contact members.

The inventor claims:

1. In a thermostat: a bimetal member anchored at one end; a first contact carried near the free end of the member; a second contact adapted to be engaged by the first contact; an electromagnet having a magnetic shell having an annular polar area, and a coil in said shell, the shell having a tubular central recess around which the coil is disposed, and said recess opening on that side of the shell opposite the polar area; means insulatingly supporting the second contact on the end wall of the recess; said polar area being opposed to the free end of the bimetal member; an insulation cup within the recess; and an adjusting screw extending into the cup.

2. In a thermostat: a bimetal member anchored at one end; a first contact carried near the free end of the member and having a contacting surface; and a second contact adapted to be engaged by the first contact; said bimetal member being bent about an axis transverse to the length of said bimetal member and adjacent said first contact for inclining said surface of said first contact with respect to the direction of movement of said first contact, to provide a component of rubbing movement between the contacts immediately upon engagement therebetween.

3. In a thermostat: a bimetal member anchored at one end; a first contact carried near the free end of the member; and a second contact adapted to be engaged by the first contact; said member being bent about an axis transverse to the length of said bimetal member and adjacent said first contact that causes movement of the free end to occur in a direction oblique to the contacting surfaces of the contacts immediately upon engagement between the contacts.

4. In a thermostat: a support; a flexible element secured at one end to the support; said flexible element having a free end spaced from, and extending in superimposed relationship with respect to said support when said flexible element is unflexed; said flexible element being arcuately movable; a first contact member carried at said free end of said flexible element; a generally U-shaped bimetal member; a second contact member having a contacting surface and carried on one arm of said bimetal member at a place spaced from the end of said one arm; means securing the other arm of said bimetal member to said support to substantially align said contact members; said one arm of said bimetal member extending on that side of said flexible element remote from said support; an adjustable abutment mounted by the support and engageable with said flexible element, said abutment being movable in a direction to flex said flexible element arcuately toward said one arm of said bimetal member; said bimetal member being bent about an axis transverse to the length of said one arm at a place along said one arm on that side of said second contact member remote from the end of said one arm, said bent arm inclining said contacting surface with respect to the direction of movement of said second contact member to provide a component of rubbing movement between the contact members immediately upon engagement therebetween; said free end being bent in a direction away from said first contact member; and an electromagnet carried by said support and having a polar area substantially aligned with the said end of said one arm.

WILLIAM A. RAY.

References Cited in the file of this patent

UNITED STATES PATENTS

| Number | Name | Date |
|---|---|---|
| 1,804,748 | Derrick | May 12, 1931 |
| 1,832,761 | Brady | Nov. 17, 1931 |
| 1,833,594 | Russell | Nov. 24, 1931 |
| 1,938,929 | Petersen | Dec. 12, 1933 |
| 1,992,765 | Petersen | Feb. 26, 1935 |
| 2,321,338 | Ulanet | June 8, 1943 |
| 2,381,557 | Ray | Aug. 7, 1945 |
| 2,413,100 | Crise | Dec. 24, 1946 |